(12) United States Patent
Smith

(10) Patent No.: US 7,370,758 B2
(45) Date of Patent: May 13, 2008

(54) CONTAINER FOR STORING MULTIPLE SAW BLADES

(76) Inventor: David S. Smith, 65 E. Broadway, Box 11, Butte, MT (US) 59701

( * ) Notice: Subject to any disclaimer, the term of this patent is extended or adjusted under 35 U.S.C. 154(b) by 113 days.

(21) Appl. No.: 11/381,206

(22) Filed: May 2, 2006

(65) Prior Publication Data
US 2006/0186004 A1 Aug. 24, 2006

Related U.S. Application Data

(63) Continuation-in-part of application No. 10/707,696, filed on Jan. 5, 2004.

(51) Int. Cl.
*A45C 11/26* (2006.01)
(52) U.S. Cl. ........................ 206/349; 206/373
(58) Field of Classification Search ...... 206/0.81–0.84, 206/349, 303, 373, 581
See application file for complete search history.

(56) References Cited

U.S. PATENT DOCUMENTS

| | | |
|---|---|---|
| 1,500,136 A | 7/1924 | Knowlton |
| 1,992,630 A | 2/1935 | Piperoux |
| 2,459,460 A | 1/1949 | Segal |
| 2,582,421 A | 1/1952 | Essman |
| 3,053,424 A | 9/1962 | Reinhard |
| 3,259,231 A | 7/1966 | Romanowski |
| 3,392,868 A | 7/1968 | Pfrommer |
| 3,870,148 A | 3/1975 | Hite |
| 4,239,308 A | 12/1980 | Bradley |
| 4,588,082 A | 5/1986 | Ridings |
| 4,875,743 A | 10/1989 | Gelardi et al. |
| 5,337,892 A | 8/1994 | Zaffina |
| 5,370,255 A | 12/1994 | Yang |
| D358,030 S * | 5/1995 | Ying ........................ D3/284 |
| 5,542,206 A | 8/1996 | Lisch |
| 5,547,078 A | 8/1996 | Iida |
| 5,715,939 A | 2/1998 | Yun-Ming |
| 5,725,096 A | 3/1998 | Winnard |
| 5,779,037 A * | 7/1998 | D'Agaro et al. ......... 206/308.1 |
| 5,797,488 A | 8/1998 | Yemini |
| 5,799,787 A | 9/1998 | Talbot |
| 6,145,515 A | 11/2000 | Wu |
| 6,318,550 B1 * | 11/2001 | Giovinazzi ............... 206/308.1 |

* cited by examiner

*Primary Examiner*—David T. Fidei
(74) *Attorney, Agent, or Firm*—Husch Blackwell Sanders

(57) ABSTRACT

A modular container for stackably storing and transporting multiple circular saw blades. The container includes multiple storage trays wherein each storage tray is able to hold one or more circular saw blades of varying diameters. The storage trays have graduating annular raised surfaces to hold saw blades securely in place during transport thereby preventing injury to the transporter and protecting the cutting teeth of the circular saw blades from being damaged due to movement within the storage container. Each storage tray horizontally pivots open to allow the user easy access to the circular saw blades stored therein.

8 Claims, 5 Drawing Sheets

CONTAINER FOR STORING MULTIPLE SAW BLADES

CROSS-REFERENCE TO RELATED APPLICATIONS

This application is a continuation-in-part of and claims priority to U.S. application Ser. No. 10/707,696, filed Jan. 5, 2004, now pending, which document is hereby incorporated by reference to the extent permitted by law.

BACKGROUND OF INVENTION

The present invention is directed to a container for storing saw blades having multiple stackable trays configured to be selectively added or removed depending on the number of saw blades to be stored. In particular, the individual trays are designed to accommodate the storage of one or more saw blades of varying diameters in a safe manner while also protecting the integrity of the blades.

Circular saw blades are used extensively for cutting a variety of materials because of their rapid and accurate cutting action. Circular saw blades are flat, disc-shaped cutting devices having a hole in the center and teeth along the periphery. Circular saw blades come in a variety of diameters, thicknesses, and cutting tooth configurations depending upon the application for which they are being used.

When installed in a circular saw, the circular saw blade revolves around its center axis at a high rate of speed to cut the desired material. There are a number of factors that directly affect the performance and efficiency of a saw blade, including the speed, smoothness, and precision of a cut. Dull or damaged cutting teeth, blade warpage, and rust or corrosion are all factors that affect the performance and efficiency of a saw blade.

One way to prevent damage to saw blades is to properly store the blades. Proper storage prevents damage to the cutting teeth when the blades are not installed on a circular saw and also safeguards against moisture that causes rust. A proper blade storage system should be portable to facilitate and promote usage. It should also be designed to protect the transporter from bodily injury from exposed cutting teeth, prevent damage to the cutting teeth, keep the saw blades from contacting one another, and be able to accommodate multiple blades of varying diameters.

In the past, a box without a lid could be employed to carry the saw blades. The box had a strap connected on opposite sides of the box for carrying. Yet to carry blades in such an open box could cause bodily injury to the user carrying the box and/or damage the blades by rubbing against one other. Circular saw blades are cutting tools that require care and can be expensive to either replace or repair if the cutting teeth become damaged. The protection of the saw blade when transferring and storing is a problem because of moisture and contact with other saw blades. An assortment of storage devices have been developed in an attempt to address the need to provide adequate protection for circular saw blades.

For example, U.S. Pat. No. 4,588,082 shows a portable carrying case for circular saw blades formed of plastic with two hinges resulting in a book-like casing; yet, unlike the present invention, this book-like casing device can store only a singular circular saw blade and, because of its triangular shape, may fall over easily if accidentally pushed.

U.S. Pat. No. 2,459,460 discloses a packing case for shipping and/or storage of circular saw blades by retaining the saw blades between two panes of Masonite and clamped on opposite sides of the saw with a single bolt through the center. Unlike the present invention, this storage device stores only one size of circular saw blades, and each blade does not have its own storage tray, thus this device does not provide a storage method that is organized and efficient as the present invention.

U.S. Pat. No. 3,870,148 describes a carrying case with a hinged top for storing a multiple number of circular saw blades. Unlike the present invention, however, this particular device is configured in a box shape and the blades move freely within compartments formed by separator inserts due to a lack of constraints within each compartment to prevent such movement.

U.S. Pat. No. 3,053,424 shows a carrier for saw blades that secures the blades vertically between two end plates with a horizontal spindle. Unlike the present invention, this particular device contains open sides which expose the blades to elements and the uncovered sharp edges of the saw blades can be fragmented or cause bodily injury or destruction to a person or material.

U.S. Pat. No. 3,259,231 discloses a plastic package for circular saw blades having two plastic circular discs with a hub in the center. Yet, unlike the present invention, this device is intended primarily for display and is limited in the amount of saw blades the display may hold.

U.S. Pat. No. 1,500,136 describes a crate designed for the shipment of flat articles such as circular saws; yet, unlike the present invention, this device is formed of lumber and lacks the lightweight and durable nature of plastic.

Those involved in the construction industry, cabinetmakers, and others who frequently use a circular saw blades, encounter a large variety of materials that can be or require the use of a circular saw blade to be cut. Each of these materials may require the use of a different type of saw blade. A single storage device that is able to accommodate multiple saw blades of varying diameters in an organized manner while also protecting the integrity of the cutting teeth offers an efficient, safe, and practical method to store saw blades. Securely storing the saw blades also ensures that the saw blades do not become damaged during storage thereby maximizing the saw blade's performance as well as safeguarding the transporter from accidental harm.

SUMMARY OF THE INVENTION

The present invention provides a safe, simple, convenient, and portable method of storing one or more saw blades of various diameters in a single container having removable and stackable storage trays, all while protecting the integrity of the saw blades and their cutting teeth.

One or more saw blades are securely contained in storage trays. Each storage tray is specifically designed to store one or more blades of various diameters. Storing the saw blades in individual trays specific to the blade's size ensures that the blades do not shift around during transport, thereby damaging the cutting teeth of the blades. It also ensures that the user is not injured by the blade edges during transport. Additionally, the individual storage trays protect the saw blades from weather elements and moisture that can rust and damage saw blades. The trays open and close horizontally by pivoting on a pin built into the tray.

The container of the present invention is a generally cylindrical, plastic storage case with multiple, stackable, interlocking storage trays, and a handle on top for transporting the case. The cylindrical design provides a stable base for the storage unit that prevents the container from tipping over from the weight of the blades when a tray is opened. It also allows for easy access to the blades themselves. One or more storage trays may be attached to the generally cylindrical storage case for modular stackability.

In use, each of the storage trays are opened by pulling on a latch mechanism located on the outside panel of each tray that disengages the latch holding the tray securely closed. When the tray is pulled outwardly, the tray swivels open and a blade can be placed in the appropriately sized recess. By placing the blade in a recess conforming to the size of the blade, the blades do not shift during transport, thereby reducing the potential for damage to the cutting teeth or the transporter. To close the trays, the trays are pushed inward to swivel back into the storage container. The latching mechanism is then engaged to lock the tray into place. The diameter and height of the storage container is large enough to efficiently store circular saw blades, yet small enough to transport easily. The top of the storage container is equipped with a single handle to conveniently pick up and transport the present invention. In another embodiment of the storage container, individual trays are designed to hold various styles and special purpose saw blades, such as dado saw blades, in addition to the traditional circular saw blades.

The storage container of the present invention also has the capability of safely storing various diameters and thicknesses of circular saw blades in an individual storage tray. This is accomplished by the storage tray's design. The storage tray contains a series of storage surfaces of varying diameters. The lowest surface has the smallest storage surface diameter. Each subsequent surface diameter is larger and higher than the preceding surface. This allows for the a single tray to store one or more circular saw blades on the appropriately-sized storage surface without the blades contacting one another. Such an organized method of storing the saw blades provides the user easy access to and easy retrieval from the individual storage trays. This is beneficial for the user because it allows the user to use one storage container for differently-sized saw blades. This is especially beneficial when the user is working at a construction site or in a workshop and needs to have immediate access to various precision saw blades. The organizational feature of the storage container of the present invention also prevents blades for becoming damaged or dulled during storage and can prevent the user from suffering bodily harm if the blades are not handled carefully. Without the structured individual storage trays of the present invention, the circular saw blades would be stored in multiple containers and this would reduce the organization, convenience, and safety offered by the present invention.

BRIEF DESCRIPTION OF THE SEVERAL VIEWS OF DRAWING

In the accompanying drawings that form a part of the specification and that are to be read in conjunction therewith and in which like reference numerals are used to indicate like parts in the various views.

DETAILED DESCRIPTION OF THE INVENTION

Figure 1:
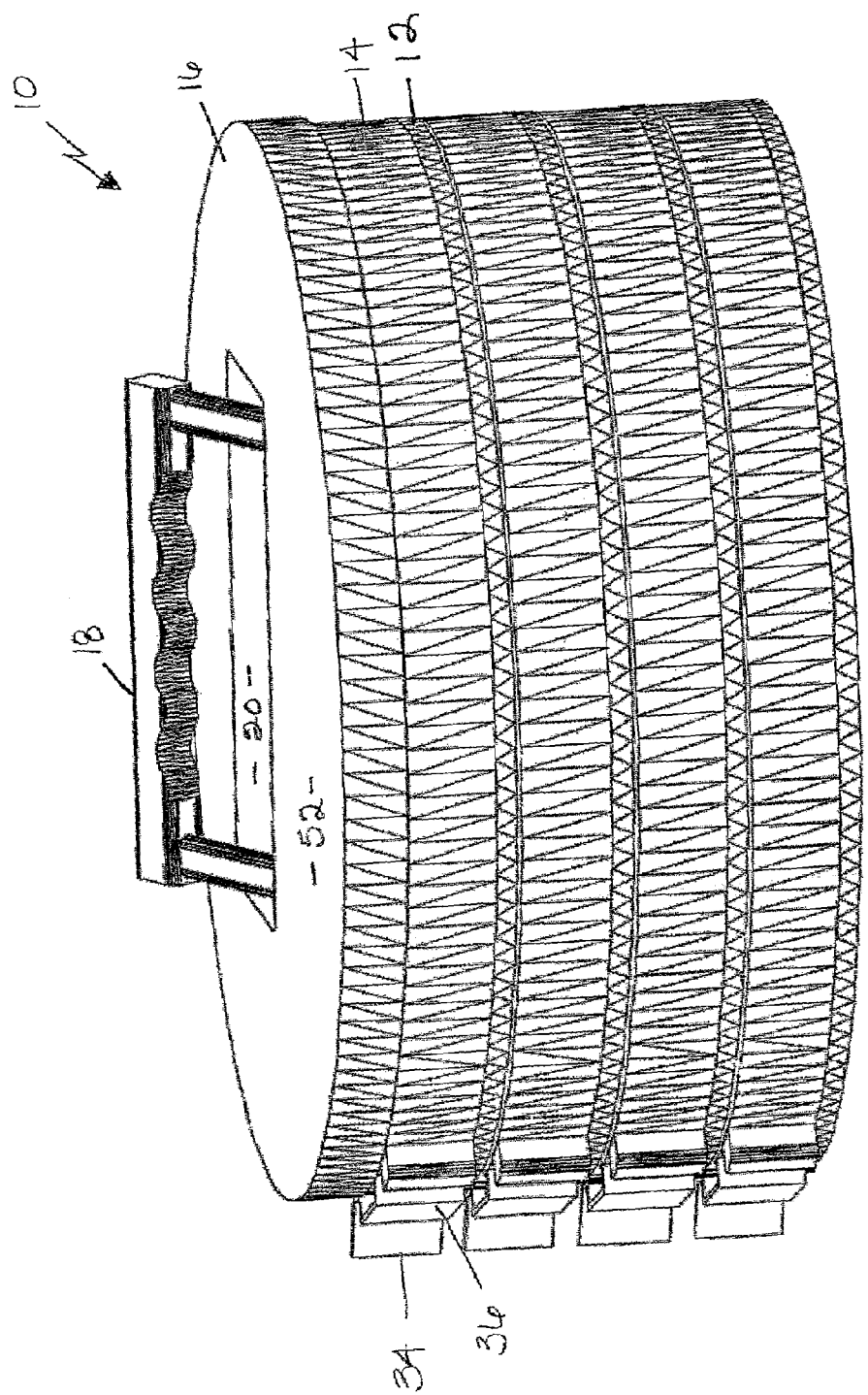
FIG. 1 is a front perspective view of the container of the present invention.
Figure 2:
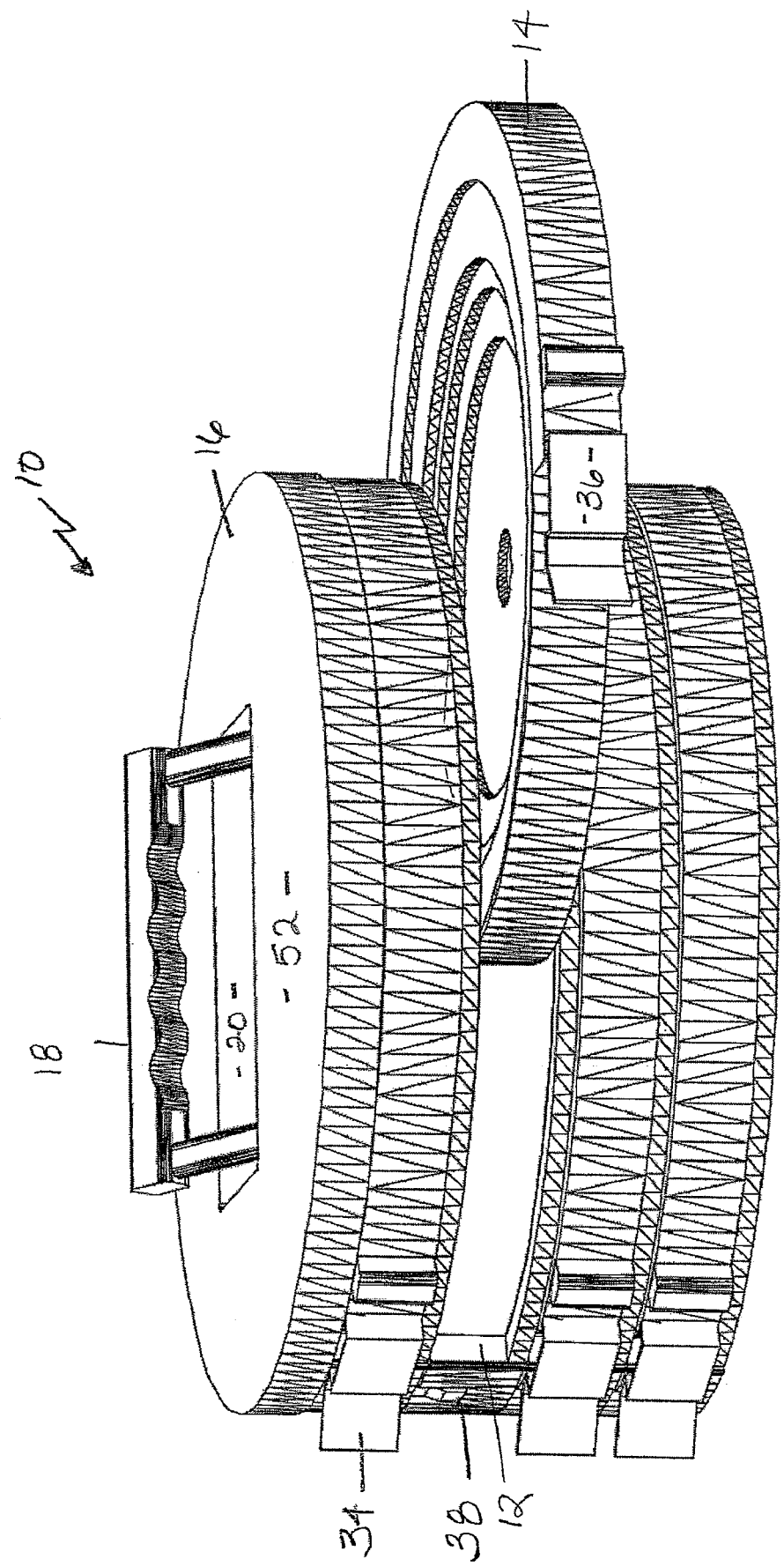
FIG. 2 is a front perspective view of the container of the present invention with one tray partially opened.

The present invention includes a portable storage container 10 for storing and transporting circular saw blades (not shown). Turning to FIGS. 1-2, storage container 10 is constructed of a lightweight, durable material, preferably a strong engineered plastic, such as high density polyethylene. The use of plastic allows storage container 10 to be durable and strong enough to sufficiently protect the circular saw blades stored inside, yet light enough to be practical for transport. When constructed out of plastic, storage container 10 is also moisture-resistant thereby preventing damage to the saw blades due to rust or corrosion. However, it will be appreciated by one skilled in the art that other materials such as wood, metal or the like may be used without departing from the spirit of the present invention. Storage container 10 is constructed in such a manner as to avoid tipping over when individual storage trays 14 are opened for access to the circular saw blades disposed on storage trays 14. The diameter and height of storage container 10 should be large enough to secure the circular saw blades without hindering the container's portability.

Figure 3:
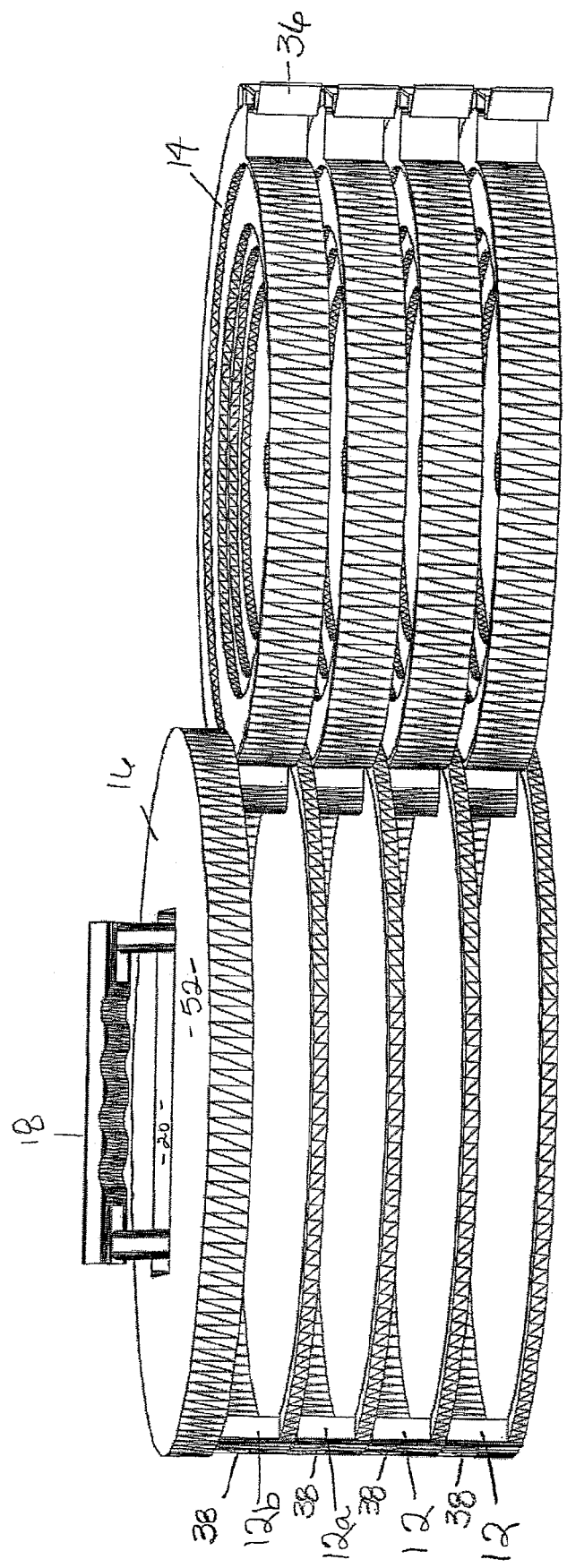
FIG. 3 is a front perspective view of the container of the present invention with all trays opened.
Figure 4:
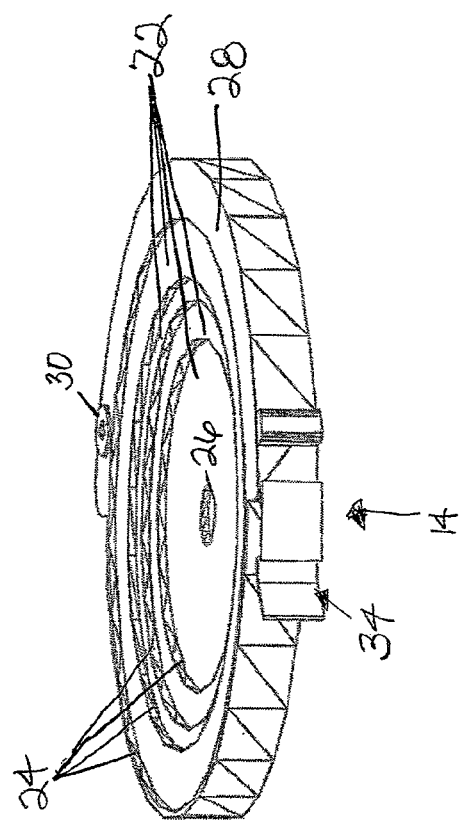
FIG. 4 is a front perspective view of a tray in its component parts.
Figure 4:
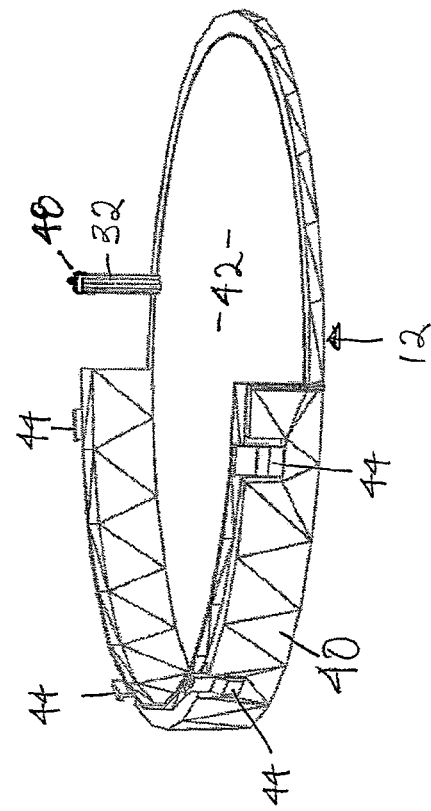
Figure 5:
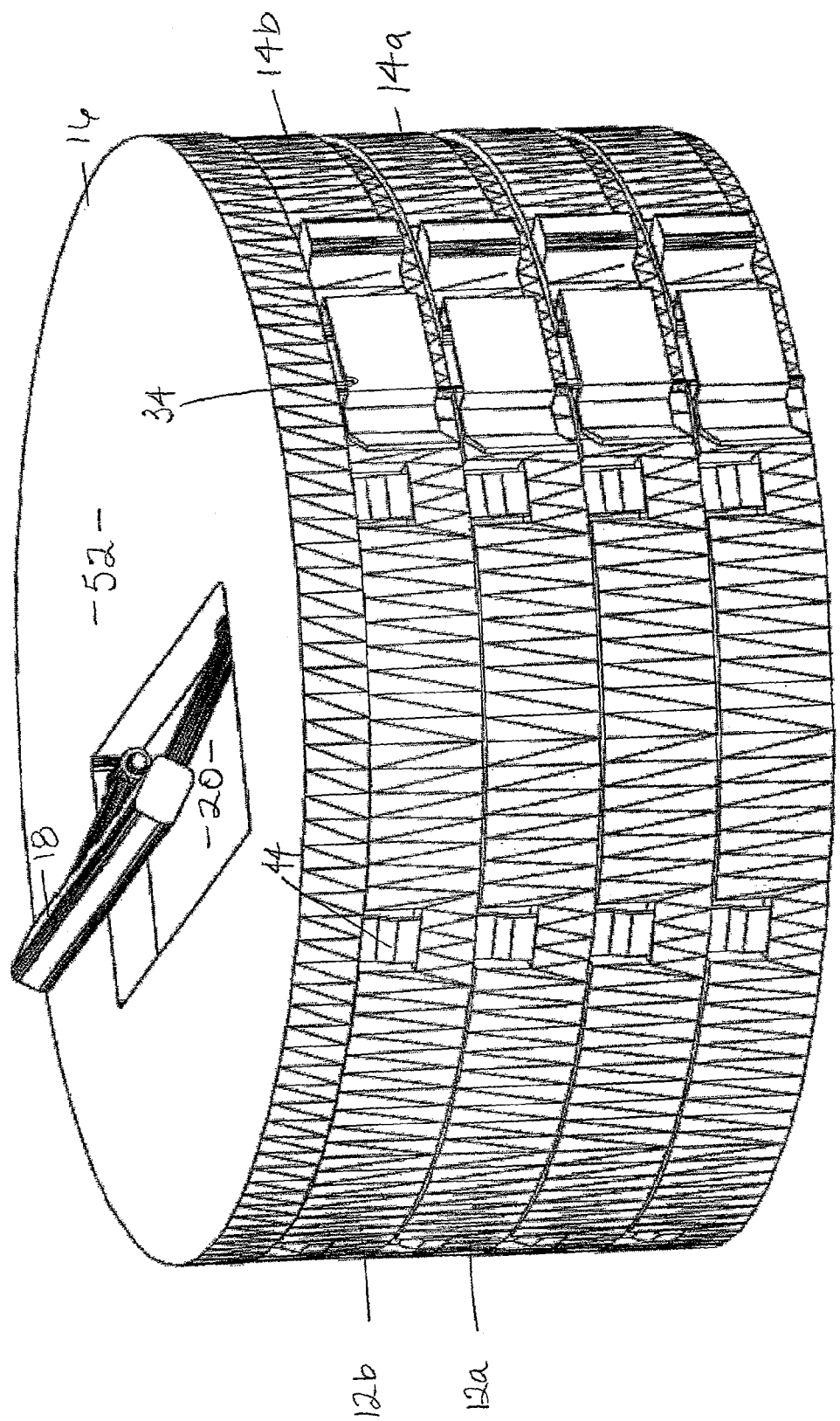
FIG. 5 is a side perspective view of the container of the present invention.

Storage container 10 includes at least one housing 12, at least one storage tray 14, and a lid 16. As shown in FIGS. 2-4, housing 12 is generally flat and, around its periphery, includes a shoulder 40 extending upwardly from the bottom surface 42 of housing 12 and running along approximately one-half of the circumference of housing 12. The exterior surface of shoulder 40 includes at least one connecting clip 44 for attaching a first housing 12a to a second housing 12b immediately thereabove as shown in FIG. 5. Below each connecting clip 44, is a clip receiving recess (not shown) configured to matingly receive connection clip 44 from housing 12a therebelow.

Generally cylindrical pivot pin 32 extends upwardly from the bottom surface 42 of housing 12 at its periphery and adjacent to shoulder 40. Pivot pin 32 is insertable into pivot pin opening 30 in storage tray 14 for pivotal movement of storage 14 tray between a closed position and an open position. At the top of pivot pin 32 is a tip 48 having a smaller diameter than pivot pin 32.

Storage trays 14 are configured to receive and securely store one or more circular saw blades having different diameters therein. Each storage tray 14 contains a series of generally circular stair-stepping surfaces 22 for the storage of circular saw blades. Surfaces 22 increase in size from the bottom of storage tray 14 to the top of the storage tray 14, each subsequent surface 22 having a larger diameter than and rising above the immediately preceding surface 22. Each surface 22 has a generally circular, elevated collar 24 for limiting the lateral movement of a saw blade within the tray 14 and preventing damage to the cutting teeth of the saw blade therein. Elevated collar 24 also serves to define the height of the next highest surface 22, such that a circular saw blade on a lower surface 22 does not contact the circular saw blade just above it on a higher surface 22. A first surface 22 of storage tray 14 defines an aperture 26 in the center to facilitate removal of the circular saw blade stored on that surface 22. The periphery of storage tray 14 contains a reinforced shoulder 28. Within reinforced shoulder 28 there is disposed a generally cylindrical pivot pin opening 30 extending from the bottom of storage tray 14 through the top of storage tray 14 for matingly and slidably receiving pivot pin 32 extending upwardly from housing 12 thereby allowing generally horizontal pivotal movement between housing 12 and storage tray 14 from a closed position to an open position so that the circular saw blades can be accessed. Reinforced shoulder 28 also contains a latch mechanism 34 opposite pivot pin opening 30 and on the exterior surface of storage tray 14 wherein latch mechanism includes a first latching mechanism 36 and a second latching mechanism 38 whereby pulling latch mechanism 34 disengages first latch mechanism 36 from second latch mechanism 38 to allow the user quick and easy access to each individual storage tray 14. Once storage tray 14 is opened, the circular saw blades are accessible. Storage tray 14 is then closed by pushing storage tray 14 inward to swivel back into storage container 10 where first latch mechanism re-engages second latch mechanism 38 to secure storage tray 14 in a closed position. It will be appreciated by those skilled in the art that the storage container 10 of the present invention is modular and may include one or more housings 12 in connection with one or more storage trays 14. Thus, depending upon the number of saw blades to be stored, one or more housings 12 and one or more storage trays 14 may be inserted into container 10 and stacked one on top of another.

Storage container 10 also includes a lid 16 to cover the uppermost storage tray 14. Affixed to the upper surface of lid 16 is a handle 18. As shown in FIGS. 1 and 2, a single handle 18 disposed on upper surface 52 of lid 16 easily and conveniently provides a means to carry the storage container 10. Handle 18 is hingedly connected to and configured to fold down into recessed compartment 20 of lid 16, as shown in FIG. 5. The outer periphery of the bottom surface (not shown) of lid 16 includes at least one clip receiving recess (not shown) for receiving at least one connecting clip 44 from housing 12 therebelow. The bottom surface of lid 16 also defines a pivot pin opening 30 for slidably receiving pivot pin 32 from 12 housing therebelow. The bottom surface of lid 16 may further includes a number of circular and spoke-like ridges (not shown) emanating from the center of lid 16 to provide rigid strength to lid 16.

From the foregoing, it may be seen that the storage container of the present invention provides an organized, convenient and safe method of storing and transporting circular saw blades. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

I claim:

1. A container for storing circular saw blades comprising:
    a first circular saw blade;
    a first housing;
    a first storage tray coupled with said first housing for pivotal movement between a closed position and an open position, said first storage tray including a floor surface and a first raised surface having a first substantially annular surface extending around said floor surface and having a generally circular wall for limiting movement of said first saw blade stored therein;
    a second housing; and
    a second storage tray in stackable relationship with said first housing and said first storage tray, said second housing being coupled with said second storage tray for pivotal movement between a closed position and an open position.

2. A container as set forth in claim 1, said first storage tray further comprising a second raised surface having a second substantially annular surface extending around said first raised surface and having a generally circular wall for limiting movement of a second saw blade stored therein wherein said second raised surface has a smaller diameter than said first raised surface.

3. A container as set forth in claim 1 further comprising a releasable latch mechanism for latching said first storage tray to said first housing.

4. A container as set forth in claim 1, wherein said first housing further comprises a pivot pin and said first storage tray further comprising a pivot pin opening for pivotably coupling said first housing to said first storage tray and allowing for pivotal movement between a closed position and an open position wherein saw blades on said tray are accessible for removal from said tray.

5. A container as set forth in claim 1 further comprising a lid.

6. A container as set forth in claim 5, said lid including a handle.

7. A container for storing circular saw blades, comprising:
    a first housing;
    a second housing;
    a first storage tray coupled with said first housing for pivotal movement between a closed position and an open position, said first storage tray including a floor surface and a first raised surface having a first substantially annular surface extending around said floor surface and having a generally circular wall for limiting movement of a first saw blade stored therein;
    a second storage tray in stackable relationship with said first housing and said first storage tray, said second housing being coupled with said second storage tray for pivotal movement between a closed position and an open position.

8. A container for storing circular saw blades, comprising:
    a first housing; and
    a first storage tray coupled with said first housing for pivotal movement between a closed position and an open position, said first storage tray including a floor surface and a first raised surface having a first substantially annular surface extending around said floor surface and having a generally circular wall for limiting movement of a first saw blade stored therein;
    wherein said first storage tray further includes a second raised surface having a second substantially annular surface extending around said first raised surface and having a generally circular wall for limiting movement of a second saw blade stored therein; and
    wherein said second raised surface has a smaller diameter than said first raised surface.

* * * * *